United States Patent [19]

Sloan

[11] Patent Number: 4,583,035
[45] Date of Patent: Apr. 15, 1986

[54] APPARATUS FOR MONITORING AND CHARGING ELECTRIC STORAGE BATTERY

[76] Inventor: Albert H. Sloan, 4201 Kean Rd., Fort Lauderdale, Fla. 33314

[21] Appl. No.: 586,228

[22] Filed: Mar. 5, 1984

[51] Int. Cl.$^4$ ............................................... H02J 7/06
[52] U.S. Cl. ...................................... 320/22; 320/31; 320/37; 320/39
[58] Field of Search ....................... 320/20, 21, 22–24, 320/37–40, 31, 32

[56] References Cited

U.S. PATENT DOCUMENTS

| | | | |
|---|---|---|---|
| 3,887,858 | 6/1975 | Burkett et al. | 320/37 X |
| 4,327,317 | 4/1982 | Heine et al. | 320/39 X |
| 4,395,672 | 7/1983 | Gassaway | 320/21 X |

*Primary Examiner*—R. J. Hickey
*Attorney, Agent, or Firm*—James E. Nilles

[57] ABSTRACT

Apparatus for monitoring and charging an electric storage battery comprises a battery charger for converting AC power from an AC source to DC power for charging the battery and further comprises a charge protector operable to continuously monitor battery terminal voltage and to connect and disconnect the battery charger from the AC source in accordance therewith to control charging of the battery. The charge protector comprises a relay which controls energization of the battery charger from the AC source, a control circuit for continuously monitoring battery terminal voltage and for operating the relay accordingly, and an indicator circuit operable to provide a visual display of battery terminal voltage and other conditions. The control circuit comprises an enabling circuit to allow initial connection of the battery charger to the AC source only if battery terminal voltage is within certain limits and of correct polarity. The control circuit also comprises a logic circuit to repeatedly effect disconnection and reconnection of the battery charger when battery terminal voltage reaches an upper trip level and a lower trip level, respectively. The control circuit further comprises an adjustable timer circuit to delay disconnection and maintain the battery charger connected for some selected interval of time after the upper trip level has been reached.

13 Claims, 5 Drawing Figures

APPARATUS FOR MONITORING AND CHARGING ELECTRIC STORAGE BATTERY

BACKGROUND OF THE INVENTION

1. Field of Use

This invention relates generally to apparatus for monitoring the terminal voltage of a storage battery and for charging and maintaining a maximum charge on the storage battery in accordance with the monitored terminal voltage.

In particular, the invention relates to an electronic charge protector employed in such apparatus to monitor terminal voltage and to control energization from an AC source of a conventional battery charger which supplies DC power to charge the battery.

2. Description of the Prior Art

Very extensive prior art exists pertaining to apparatus for charging electric storage batteries. Such apparatus typically comprise a battery charger energizable from an AC power source which converts the AC power to DC power which is supplied to the battery terminals to charge the battery. The main function of a battery charger is to cause electric current to flow back into a battery in the opposite direction from which current flowed during discharge. The current for charging can come from various sources, but presently the typical source is a stepdown transformer connected to an AC power source and a solid-state rectifier providing DC power to the battery terminals. Formerly, either motor generators or stepdown transformers with selenium rectifiers, were extensively used as chargers.

Some prior art battery chargers include protective means for sensing the level of the battery charge (i.e., battery terminal voltage) and for taking appropriate action in accordance therewith so as to prevent overcharging with its attendant risks, i.e., damage to the battery plates, damage to the charger or gasing of the plates and creation of a corrosive or explosive hydrogen-filled atmosphere. For example, some chargers automatically stop applying heavy charging power when the battery is almost or fully charged so as to prevent overcharging. Others continue to supply a steady low-power trickle or float charge to apply a full charge or to maintain the full charge after the battery is fully charged. In some cases the heavy charging power and/or trickle charge is applied as a tapered charge i.e., one in which applied voltage is gradually decreased (i.e., automatic rate reduction), either smoothly or in incremental steps. Some prior art chargers employ timers to limit charging to some arbitrarily selected time interval or to operate the charger at selected on-off time intervals; either before or after full charge is reached.

As previously explained herein, some prior art chargers employed selenium rectifiers and it was necessary to disconnect (manually or automatically) the DC charging leads from the battery terminals to prevent leakage from the battery after charging was completed. However, in battery chargers not using such rectifiers, charging can be terminated either by disconnecting the charger from its AC power source, or by disconnecting the battery from the charger, or both. Some prior art chargers included indicator devices, such as meters or lights to indicate the status of the battery being charged and the status of the charger i.e., on, off, full power, trickle power, etc. Some chargers include polarity protective means to prevent reverse polarity connection of the battery to the charger.

In the charging operation of a typical lead-acid type storage-battery, such as used in vehicles, including autos, boats, aircraft, or in stand-by power systems or the like, the following situation typically occurs.

If, for example, a battery rated at 12 volts is "down", or discharged, the battery terminal voltage will typically be under 12.5 volts, but above 11 volts. When a charger connected to this battery is turned on, the charging voltage of the charger is usually somewhere between 13.5 volts and, at a maximum, 15 volts. The moment the charger is energized, the battery builds up a counter-emf and the voltage across the battery terminals will rise much higher than the actual voltage produced in the battery i.e., the higher the charger voltage, the higher the counter-emf. Since the voltages are fairly well matched, not much current can be forced back into the battery. As a result, a battery charger, in order to charge well, has to have voltage high enough to overcome this counter-emf in order to force current into the battery at a high rate. However, when this is done, and the battery becomes charged, (assume an 80 ampere-hour rated battery and it is charged to deliver 70 of the 80 amperehours) the battery will start gassing profusely at the charge rate at the "top end" of the battery charge (called "topping off the battery"). It is very easy to charge a battery to 50% or 60%, or even 70%, of its rated ampere-hour potential, to a level below 14 volts. This is called "float charging". But, then, the battery plates don't gas as they should and a scum forms on the battery plates and this decreases the ampere-hour rating of the battery. As a result, the battery delivers a smaller potential than its rating. So-called "float charging" does solve the problem of burning up the battery due to high gassing over a period of time, but it also creates a problem in that the battery no longer has the original ampere-hour rating.

SUMMARY OF THE PRESENT INVENTION

In accordance with the present invention there is provided improved apparatus for monitoring and charging an electric storage battery. The improved apparatus comprises a conventional battery charger for converting AC power from an AC source to DC power for charging the battery. The improved apparatus further comprises a charge protector in accordance with the present invention which is operable to continuously monitor battery terminal voltage and to connect and disconnect the battery charger from the AC source in accordance therewith to control charging of the battery. The charge protector comprises a relay which controls energization of the battery charger from the AC source, a control circuit for continuously monitoring battery terminal voltage and for operating the relay accordingly, and an indicator circuit operable to provide a visual display (light display) indicative of battery terminal voltage and other conditions, such as charger energization and timer energization status. The control circuit comprises an enabling circuit to allow initial connection of the battery charger to the AC source only if battery terminal voltage is within certain limits and of correct polarity. The control circuit also comprises a logic circuit to repeatedly effect disconnection and reconnection of the battery charger when battery terminal voltage reaches an upper trip level and a lower trip level, respectively. The control circuit further comprises an adjustable timer circuit to delay disconnection and maintain the charger connected for some selected interval of time after the upper trip level has been reached.

Apparatus employing a charge protector in accordance with the present invention offers numerous advantages over the prior art. For example, it not only provides an initial charge to a run-down battery, but it then continues to maintain it in charged condition. It can be employed in a facility to which batteries are brought for periodic service or can be installed at a location or in a vehicle to continuously monitor and maintain the battery thereat or therein. It will not operate to attempt to charge a battery which is improperly connected to the apparatus, or which is unfit to be charged (as a result of internal shorting, for example), thus preventing damage to the battery or the battery charger or the charge protector. It prevents battery overcharge while ensuring that the battery is charged to full capacity and constantly available for use. It monitors actual battery condition and does not require an operator to guess at battery condition or use randomly selected voltage or timed charging parameters. It provides a positive informative display of battery condition and of the status of components in the apparatus. It reduces electrolyte consumption during charging and substantially increases the time interval at which water needs to be added to the battery. It prevents battery plate fouling during charging and ensures maximum rated power output availability from the battery. It is economical to manufacture and install and is fool-proof and reliable in use. Other objects and advantages will hereinafter appear.

DRAWINGS

DESCRIPTION OF A PREFERRED EMBODIMENT

Figure 1:
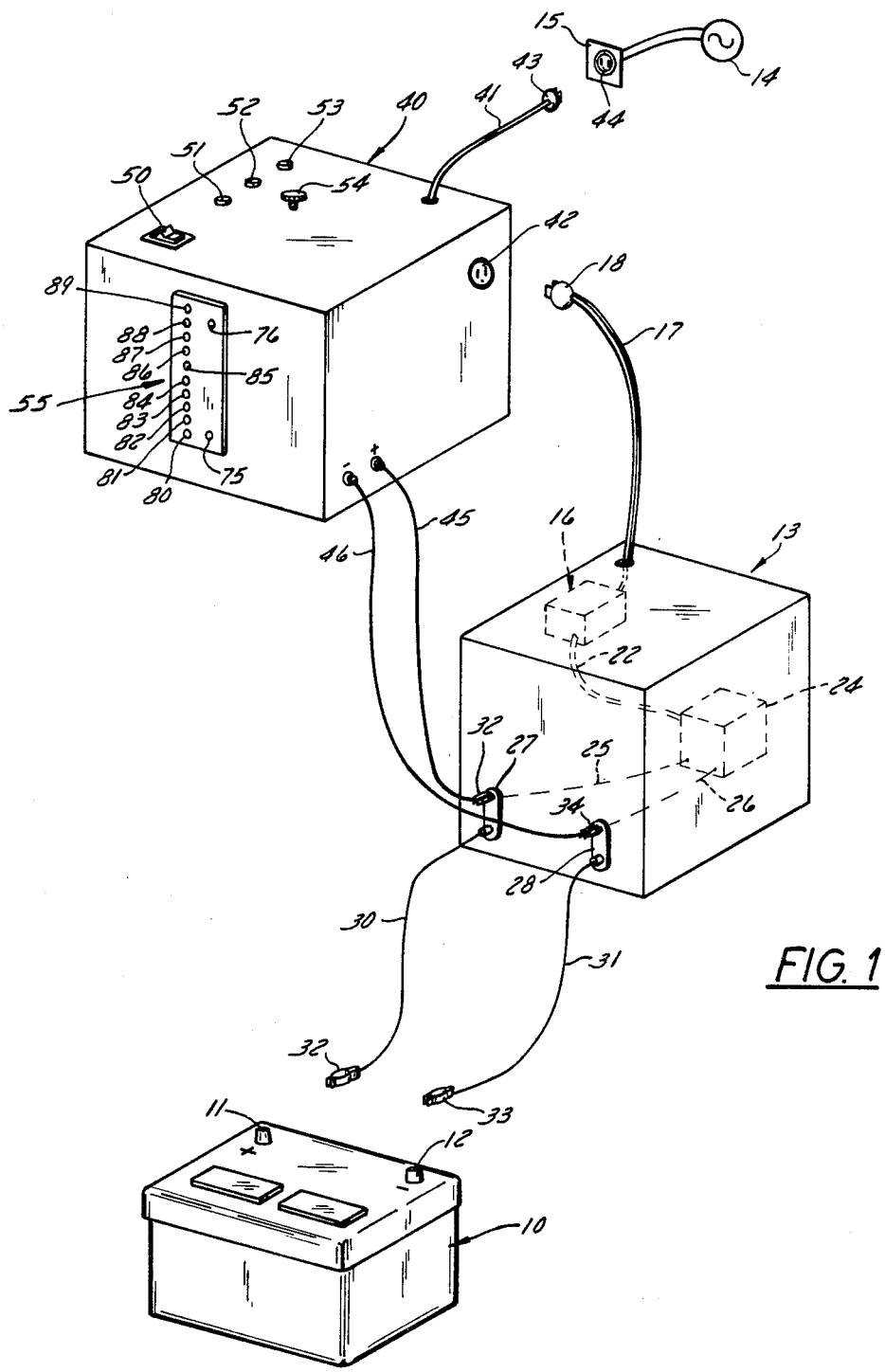
FIG. 1 is a schematic perspective view of apparatus in accordance with the present invention, including a battery, a battery charger and a charge protector.

Referring to FIG. 1, there is shown apparatus in accordance with the invention, including a battery charger 13 and a charge protector 40, for monitoring and charging an electric storage battery 10. Battery 10 comprises positive and negative DC terminals 11 and 12, respectively, and may be assumed to be a conventional lead-acid 12 volt "negative-ground" type storage battery rated at 80 ampere-hours.

Battery charger 13 may be assumed to be a commercially available battery charger for converting AC electric power from an AC source 14, such as a 110 volt single-phase source, to low-voltage DC electric power for supplying and charging battery 10. Charger 13 comprises, for example, a step-down transformer 16 and a rectifier 24. Step-down transformer 16 is provided on its input side with a two-conductor AC line cord 17 having a two-pronged plug 18 and is provided on its output side with an internal connection, shown schematically at 22, which is connected to the input side of AC-DC rectifier 24. Plug 18 is insertable into a socket 42 on charge protector 40 which is connectable to AC power source 14, as hereinafter explained. The output side of rectifier 24 has internal connections, shown at 25 and 26, which are connected to positive and negative battery charger DC output terminals 27 and 28, respectively, mounted on the exterior of charger 13. Charger terminals 27 and 28 are adapted to be connected to battery terminals 11 and 12, respectively, of battery 20, by conventional flexible charging leads or cables 30 and 31, respectively, which have spring-loaded battery terminal clips 32 and 33, respectively. As will be understood, battery charger 13 may comprise other conventional components (not shown) necessary for its proper operation and could take a form other than that shown.

The charge protector 40 is operable to continuously monitor the terminal voltage of battery 10 and to connect and disconnect battery charger 13 from the AC power source 14 in accordance therewith to control charging of battery 10, as hereinafter explained in detail. Charge protector 40 comprises a two-conductor AC line cord 41 having a two-prong plug 43 for connection to AC wall socket 15 and also comprises a conventional two-hole socket 44 which is energizable with AC power from source 14 to which plug 18 of line cord 17 of battery charger 13 is connectable. Charge protector 40 also comprises two flexible battery voltage sensing leads or cables 45 and 46 having clips 33 and 34, respectively, which are internally connected at one end to circuitry within charge protector 40. The external ends of the voltage sensing leads 45 and 46 are externally connected to the DC charger terminals 27 and 28, respectively, of battery charger 13, and thence to the battery terminals 11 and 12, respectively, of battery 10, when the charging leads 30 and 31, respectively, are connected to battery 10. If preferred, the leads 45 and 46 could be connected directly to the battery terminals 11 and 12, respectively, by the spring-loaded clips 33 and 34. Charge protector 40 also comprises a manually operable on-off line cord switch 50 in line cord 41, a replaceable line cord fuse or circuit breaker 51 in line cord 41, a manually operable pushbutton 52 for a set switch 91, a manually operable pushbutton 53 for a reset switch 92, a rotatable control knob 54 for a timer rheostat, and an indicator light display panel 55 comprising indicator lights hereinafter described.

Figure 2:
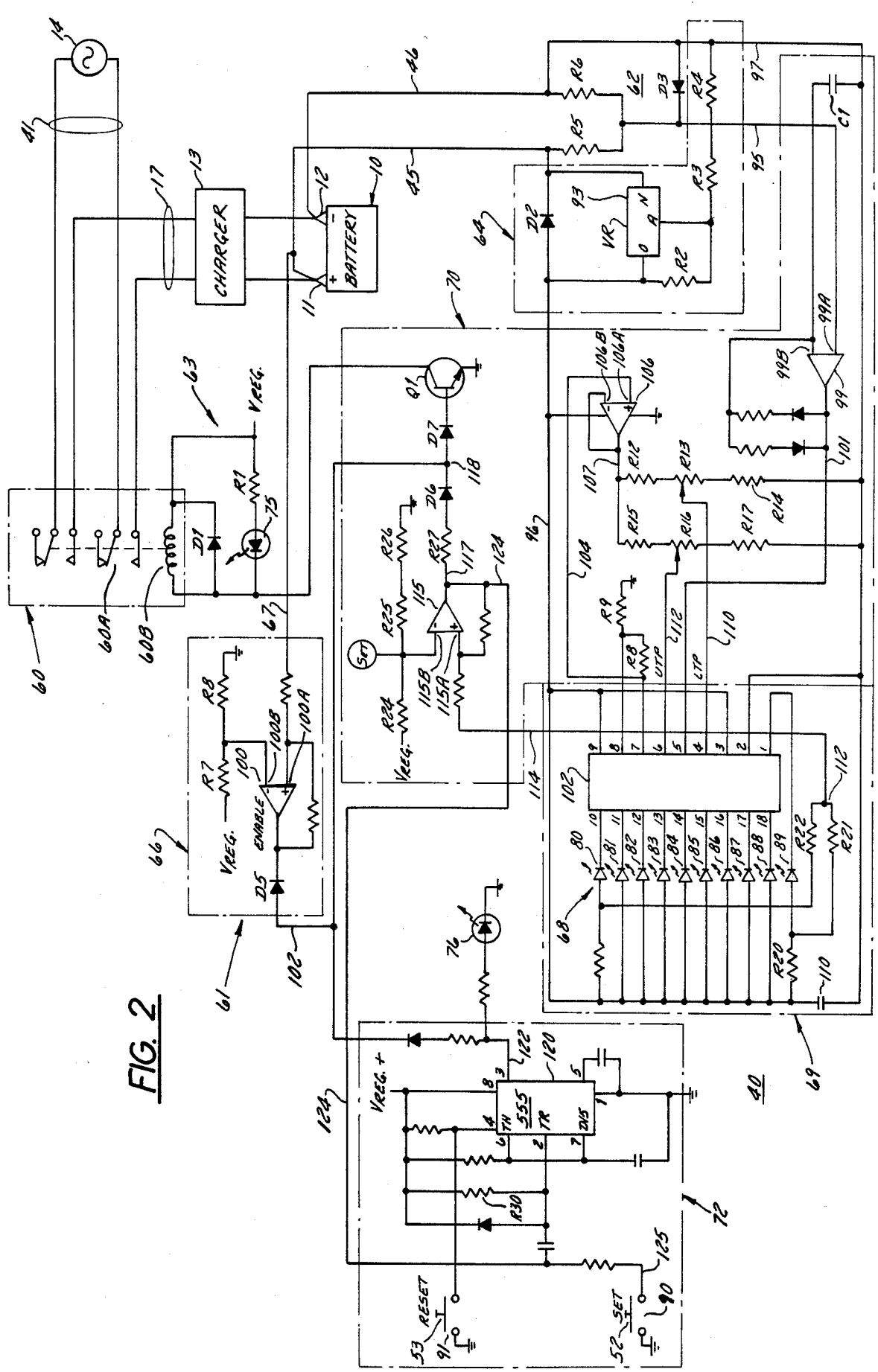
FIG. 2 is an electric circuit diagram of the apparatus shown in FIG. 1.

As FIGS. 1 and 2 show, the indicator light display panel 55 includes a charger energization status (charge indicator) lamp 75, a timer status lamp 76, a lower trip point indicator lamp 80, an upper trip point indicator lamp 89 and eight battery voltage level indicator lamps in the form of light-emitting diodes (LEDs) designated by the numerals 81 through 88. Lamps 75, 76, 80 and 88 also take the form of LEDs.

As FIG. 1 makes clear, when the apparatus is in use, charge protector 40 is plugged into wall outlet 15, battery charger 13 is plugged into outlet 42 on charge protector 40, the battery charging leads 30 and 31 are connected between battery charger 13 and terminals 11 and 12, respectively, of battery 10, and the voltage sensing leads 45 and 46 are connected between charge protector 40 and terminals 11 and 12, respectively, of battery 10 (either directly or through the leads 30 and 31, respectively). Charge protector 40 is readied for operation by appropriate adjustment of timer rheostat control knob 54, placement of line cord switch 50 in "on" position, and activation of pushbutton 52 for set switch 90 (and reset pushbutton 53 when needed).

Referring now to FIG. 2, the construction, circuitry and mode of operation of charge protector 40 will now be described in detail. Charge protector 40 generally comprises a relay 60 which controls connection of battery charger 13 to AC power source 14 and a control circuit, generally designated 61, for continuously monitoring battery voltage and operating relay 60 accordingly. Relay 60 comprises relay contacts 60A and a relay coil 60B. Control circuit 61 generally comprises the following circuits, namely: a battery terminal voltage signal input circuit 62, a voltage regulating circuit 64 for providing operating power and a reference voltage, a relay driver circuit 63, an enabling circuit 66, a logic circuit 70, an adjustable timer circuit 72 and an indicator circuit 69.

Signal input circuit 62 is connected to the leads 45 and 46 from battery 10 and comprises voltage reduction resistors R5 and R6 which, with diode D3 connected across resistor R6, define a voltage divider network which provides a signal on line 95 representative of battery terminal voltage.

Voltage regulating circuit 64 is also connected to the leads 45 and 46 from battery 10 and comprises an integrated circuit device 93, resistors R2, R3 and R4 and a diode D2. Circuit 64 provides low-voltage operating power on lines 96 and 97 for circuit 61, relay 60 and the LEDs. Circuit 64 also provides a regulated low-voltage power supply for reference voltage signals at points designated "V reg" in FIG. 2.

Relay driver circuit 63 comprises a transistor Q1 connected in series circuit with relay coil 60B between a "V reg" power terminal and ground. Enabling circuit 66 operates to allow initial connection of battery charger 13 to AC source 14 only if battery terminal voltage is within certain limits and of correct polarity. The logic circuit 70 operates to repeatedly effect charger disconnection and reconnection when battery voltage reaches an upper trip level and a lower trip level, respectively. The adjustable timer circuit 72 operates to maintain charger 12 connected for a selected interval of time after the upper trip has been reached. The indicator circuit 69 operates to provide a visual read out (light display) indicative of battery voltage levels, and comprises an indicator driver device 102.

More specifically, relay 60 comprises a pair of normally open relay contacts 60A which are connected in series between line cord 41 and receptacle 43. A relay coil 60B is connected on one side to the positive V reg terminal of voltage regulating circuit 63 and is connectable on its other side through normally off PNP switching transistor Q1 to ground. A protective diode D1 is connected in parallel with relay coil 60B. The charge indicator lamp 75 is connected in series with a voltage dropping resistor R1 across relay coil 60 and emits light when the coil is energized.

The voltage regulating circuit 64 includes a type 117N integrated circuit device 93 which is connected across the battery voltage sensing leads 45 and 46 (i.e., battery terminals 11 and 12) in circuit with suitable regulating resistors R2, R3, R4 and a diode D2. The circuit 64 serves two functions: to provide a regulated minimum reference voltage and to provide a regulated power supply on power supply lines 96 and 97 for operating the electronic components in charge protector 40, including relay 60 and the light display panel 55. The power supply lines 96 and 97 are coupled to each other through a capacitor 110.

Figure 5:
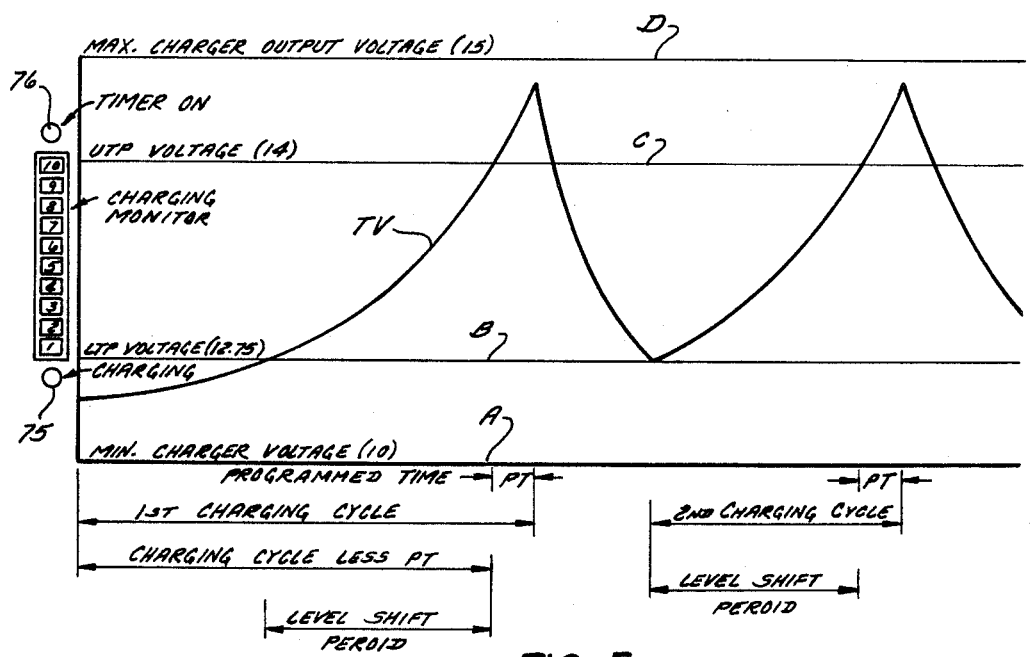
FIG. 5 is a graph depicting typical operational sequences of the apparatus shown in FIGS. 1 and 2.

The enabling circuit 66 compares the battery terminal voltage to a factory predetermined initial reference voltage and provides an output signal to initially turn on transistor Q1 (and effect closure of the relay contacts 60A) only if the terminal voltage is an "enabling voltage" which is within a certain range (i.e., between 10 and 12.75 volts, for example as lines A and B in FIG. 5 make clear, and of correct polarity. Enabling circuit 66 comprises a logic gate 100 for receiving a terminal voltage signal at its input terminal 100A from a lead 67 connected to sensing lead 45 (i.e., to battery terminal 11), for receiving a reference voltage signal at its other input terminal 100B from a voltage divider network comprising resistors R7 and and R8, and for providing an output signal on line 102 which is connected to the base terminal of transistor Q1. Line 102 includes a diode D5 poled so as to permit passage of a voltage signal of correct polarity and thus ensures that relay 60 will not operate unless the sensing leads 45 and 46 (and line 67) are connected to the correct battery terminals. This prevents damage to charge protector 40, to battery 10 and to battery charger 13.

The enabling circuit 66 prevents a battery charger which is designed to operate to charge batteries of some specified voltage (i.e., 6, 8, 12 or 24 volts, for example) from being turned on in response to connection to a battery of some lower voltage for which it is not intended. For example, a nominal 12 volt system would be set at the factory to turn on at 10.5 volts. Thus, since as hereinafter appears, the charge protector 40 also involves an upper trip point (UTP) voltage such as 14 volts at which the battery charger 13 would be shut off, connection of a relatively high voltage battery (one rated at more than 14 volts) to a charge protector 40 set at a lesser upper trip point (UTP) voltage would prevent the charger 13 from being turned on i.e., it would consider the mistakenly-connected higher-voltage battery as fully charged. On the other hand, with a battery which is ompletely discharged or internally shorted so that some predetermined minimum voltage does not appear at the battery terminals, the charger 13 will not be turned on and this prevents further damage to an internally shorted battery or short circuit damage to the charge protector 40 or charger 13. Typically, for example, a charge protector enable voltage for 12 or 6 volt batteries would be set at 10.5 or 5 volts, respectively, or the minimum charger voltage (see line A in FIG. 5). Improper connection of the positive and negative battery terminals also results in lack of an enabling voltage to cause connection of the charger 13 and thus serves as a polarity reversal protection.

The logic circuit 70 operates to effect disconnection of charger 13 when battery terminal voltage, which is constantly being monitored, reaches some predetermined upper trip point or level (UTP), such as 14 volts for a 12 volt battery (see line C in FIG. 5). Logic circuit 70 also effects charger reconnection when battery terminal voltage reaches some predetermined lower trip point or level (LTP), such as 12.75 volts for a 12 volt battery (see line B in FIG. 5). It is to be understood, however, that charge protector 40 includes the timer circuit 72, hereinafter described in detail, which prevents the logic circuit 70 from turning off the charger 13 when the upper trip point (UTP) is reached, at least for a selected predetermined interval of time, such as 10, 20 or 30 minutes, depending on selection.

Logic circuit 70 comprises a solid state amplifier or integrator device 99 which has one input terminal 99A connected to positive signal line 95 to receive the reduced voltage battery terminal voltage signal and has its other input terminal 99B connected to negative line 97 through a capacitor C1. Device 99 operates to further reduce the value of and to filter and smooth the battery terminal voltage signal on line 95 and to provide an output signal on line 101 which is supplied to a bar graph or light display driver device 102 for the light display 68. Display driver circuit 69 comprises a known commercially available type LM 3914 integrated circuit device 102 which responds to the buffered battery terminal voltage signal on line 101 to regulate or control the light display 68 in accordance with battery voltage. Line 101 is connected to input terminal 5 of device 102. Device 102 receives reference voltage signals which are generated by a voltage divider circuit comprising the series-connected resistors R8 and R9 and fed to terminals 7 and 8 of device 102. The reference voltage signal at terminal 7 is fed through a line 104 to the positive input terminal 106A of a solid state amplifier 106 so as to provide a stable buffered reference voltage signal to the output line 107 of amplifier 106. Amplifier 106 is connected for energization between power supply line 96 and ground.

A first voltage divider network is provided in logic circuit 70 for furnishing a low trip point (LTP) reference voltage signal to terminal 4 of device 102. This first network comprises a fixed resistor R12, a rheostat R13 and a fixed resistor R14 connected in series between reference voltage output line 107 and negative power supply line 97. The rheostat R13 is connected by a line 110 to terminal 4 of device 102.

A second voltage divider network is provided in logic circuit 70 for furnishing an upper trip point (UTP) reference voltage signal to terminal 6 of device 102. This second network comprises a fixed resistor R15, a rheostat R16 and a fixed resistor R17 connected in series between reference voltage output line 107 and negative power supply line 97. The rheostat R16 is connected in series between reference voltage output line 107 and negative power supply line 97. The rheostat R16 is connected by a line 112 to terminal 6 of device 102.

Adjustment of the rheostats R13 and R16 sets the lower trip point and upper trip point, respectively, of charge protector 40 (see lines B and C of FIG. 5). These points are independently adjustable.

The logic circuit 70 and indicator driver device 102 operate both the voltage level indicator circuit 68 and the relay 60. The indicator circuit 68 comprises the ten LEDs 80 through 89 which are physically mounted on display panel 55 and each of these LEDs has one side connected to positive power supply line 96. The LEDs 80 and 89 are each connected through a voltage-dropping resistor such as R20. Each LED 80 through 89 has its other side connected to an appropriate power output terminal on device 102. A pair of resistors R21 and R22 are connected in series with each other across the input terminals to the LEDs 80 through 89 and, along with the resistors R20, provide a voltage dividing network which provides a voltage level output signal at point 112. If both LEDs 80 and 89 are energized (i.e., lit), there is a voltage signal at 112 which will effect de-energization of relay 60 and, thus, de-energization of battery charger 13. If, however, both LEDs 80 through 89 are de-energized (i.e., unlit), there is no voltage signal at 112 and relay 60 and, thus, battery charger 13 will be energized. More specifically, point 112 is connected by line 114 to the positive signal input terminal 115A or a solid state amplifier 115 which serves to control actuation of transistor Q1 and, thus relay 60. The negative signal input terminal 115B of amplifier 115 is connected to receive a reference voltage from a voltage dividing network comprising resistors R24, R25 and R26. The signal output terminal of amplifier 115 is connected by a line 117 to the base terminal transistor Q1. Line 117 contains a voltage-dropping resistor R27 and diodes D6 and D7 poled as shown in FIG. 2 to control direction of current flow.

The timer circuit 72 is connected to signal output line 117 at a point 118 and operates, when activated, to provide a voltage signal on line 117 to operate (render conductive) transistor Q1 and relay 60 for some predetermined interval of time (such as 10 minutes or more), even though the output signal from amplifier 115 is an "off" signal, as when the battery 10 has been charged to the upper trip point (UTP). Timer circuit 72 comprises a solid state timer device 120 in the form of a type 555 integrated circuit, and also comprises switches 90 and 91, manually operable by pushbuttons 52 and 53, respectively, which are selectively operable to override the automatic timing function of timer device 120 and allow the human operator of the system to prolong or cut short the automatic time period, as he sees fit. Timer device 120 is connected by its terminals 8 and 1 for energization between the positive terminal of voltage regulator 64 and ground. The signal output terminal 3 of timer device 120 is connected by a line 122 to point 118, hereinbefore described, and thus to the base of transistor Q1. "On" operation of timer device 120 is initiated by introduction of a "timer start" signal at terminal 2, wither automatically from a line 124 which is responsive to the presence of a signal on line 114 and line 117, or manually from a line 125 which is energized by momentary closure of set switch 90 which starts the timer as a result of charging of a timer capacitor C3. Capicator C3 and resistor R30 form a conventional RC timer circuit. "Off" operation of timer device 120 is controlled automatically in response to discharge of capacitor C3. "Off" operation of timer device 120 can also be effected by momentary manual closure of reset switch 81 which has one side connected to terminal 4 of timer device 120 and to the voltage regulator and its other side connected to ground. The timer indicator light 76 is connected to terminal 3 of timer device 120.

Referring now to FIG. 5, the graph therein depicts a typical operation of the apparatus shown in FIGS. 1 and 2. The graph is shown in association with the lamps 75, 76 and 80 through 89 in the visual display panel 55. In the graph, four horizontal lines are designated as follows: line A is the minimum enabling voltage level (10 volts, for example), line B is the lower trip point (LTP) voltage leval (12.75 volts, for example), line C is the upper trip point (UTP) voltage level (14 volts, for example), and line D is the maximum charger output voltage level (15 volts, for example). The curve TV represents battery terminal voltage level plotted against time. Specified time intervals are included in the graph beneath line A and are co-related to curve TV.

Figure 3:
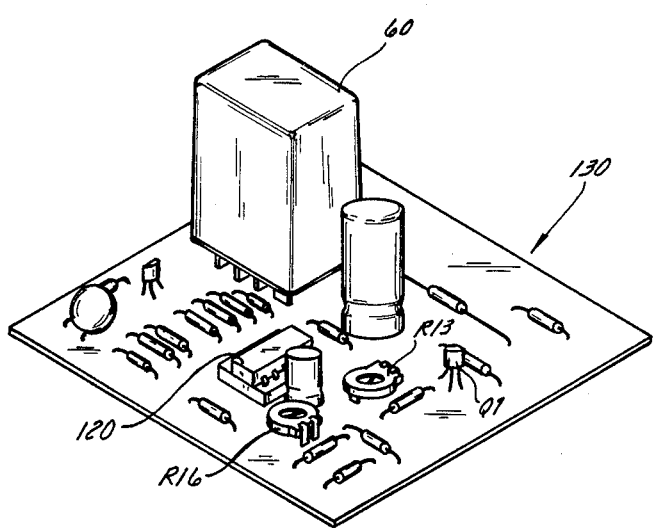
FIG. 3 is a perspective view of a circuit board embodying a portion of the charge protector shown in the circuit diagram of FIG. 2.
Figure 4:
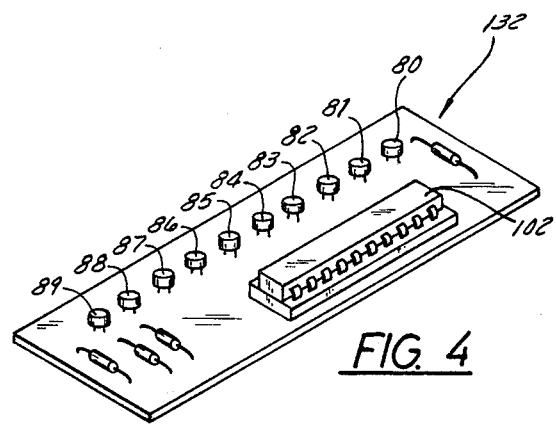
FIG. 4 is a perspective view of another circuit board embodying another portion of the charge protector shown in the circuit diagram of FIG. 2.

Referring to FIGS. 3 and 4, it is seen that certain components of charge protector 40 are conveniently embodied in one printed circuit board 130 and others are conveniently embodied in a separate printed circuit board 132. However, other suitable arrangements could be provided.

The operation of the apparatus shown in FIGS. 1 and 2 is best understood by reference to the graph in FIG. 5 in conjunction with the following description.

Assume initially that the system components shown in FIGS. 1 and 2 are connected as shown in FIG. 2 and that battery B is a conventional 12 volt lead-acid storage battery in need of a charge, initially providing a terminal voltage level TV between the level lines A and B, and connected for correct polarity.

Under these circumstances, enabling circuit 66 turns on transistor Q1 which, in turn, energizes relay coil 60B and relay contactor 60C close to energize battery charger 13 from the AC power source 14. Charge indicator lamp 75 goes on. The first charging cycle commences.

As charging continues, the battery terminal voltage level TV increases and reaches the lower trip point (LTP) charging level at line B in FIG. 5 and subsequently reaches the upper trip point (UTP) charging level at line C in FIG. 5. The time period between the shift from level B to C may take several hours. As terminal voltage increases, the LEDs designated 80 through 89 turn on in sequence to visually indicate charge level.

When the upper trip point (UTP) charging level at line C in FIG. 5 is reached, charger 13 would otherwise tend to turn off, except for the fact that timer circuit 72 automatically operates to maintain relay 60 and charger 13 energized for some predetermined interval at which it has been set at the factory and this time interval is designated PT in FIG. 5. Timer light 76 goes on.

When the time interval PT expires, charger 13 is shut off, timer light 76 goes off, battery 10 is no longer being charged and battery terminal voltage gradually floats back down past line C to the predetermined lower trip point designated by line B in FIG. 5. There is no specific interval of time during which such float down occurs, but the delay might extend over a period of 3 to 6 to 8 hours. When terminal voltage drops below line C, LED 89 goes off. When battery terminal voltage reaches line B, in FIG. 5, all indicator LEDs 80 through 89 have turned off.

When battery terminal voltage reaches line B, the lower trip point voltage, relay 60 and charger 13 again become energized and lamp 80 goes on. The battery terminal voltage, as indicated by line TV in FIG. 5, again increases as the second charge cycle commences and is carried out. Typically, the time interval required for battery terminal voltage to increase from line B to line C will be shorter than in the first charge cycle, but the time interval during which timer circuit 72 remains on is constant for each cycle.

The aforedescribed repetitive charging cycle is repeated over and over as long as battery conditions warrant. The successive intervals of time when charger 13 is turned off will gradually increase in length and the successive intervals of time when charger 13 is turned on will gradually decrease in length. When charger 13 is turned off, the charge protector 40 draws only a nominal amount of power directly from battery 10—enough to monitor voltage level and to effect turn-on of relay 60 when needed. The LEDs show the system operator the exact state of affairs. The battery 10 may remain connected to the charger 13 and charger protector 40 indefinitely without risk of overcharge and with the advantage of always being up to its rated standard.

As previously explained, the upper and lower trip points can be adjusted to suit particular situations and the timer 72 can be adjusted by substitution of proper R-C components connected to timer device 120. Or, in operation, the timer 72 can be stopped by set button 52 or restarted by means of reset button 53. Thus, the timer circuit 72 has a "minimum" automatic on period which can be overridden and avoids system oscillation. Maintaining the timer "on" expedites charging within certain limits.

I claim:

1. A charge protector for battery maintenance and operable to continuously monitor the battery terminal voltage of a storage battery while the latter is not in use and to control charging of the battery by controlling the supply of DC power from a battery charger to the battery in accordance with the battery terminal voltage, said charge protector comprising:

means energizable from said battery to sense said battery terminal voltage;

means energizable from said battery to effect initial supply of DC power to said battery when said battery terminal voltage is sensed as being at a predetermined minimum charge voltage level;

means energizable from said battery to repeatedly effect subsequent termination and resupply of DC power to said battery when said battery terminal voltage is sensed as having reached an upper trip level voltage and a lower trip level voltage, respectively, said lower trip level voltage being greater than said minimum charge voltage and said upper trip level voltage being greater than said lower trip level voltage;

and timer means energizable from said battery to maintain the supply of DC power to said battery for a predetermined interval of time after said battery terminal voltage is sensed as having reached said upper trip level voltage but before it reaches a maximum charge level voltage which is greater than said upper trip level voltage.

2. A charge protector according to claim 1 including means energizable from said battery to adjust the upper and lower trip level voltages.

3. A charge protector according to claim 1 or 2 including means energizable from said battery to adjust the length of said predetermined interval of time.

4. A charge protector according to claim 1 or 2 including means energizable from said battery to indicate that said trip level voltages have been reached and that said timer means is in operation.

5. A charge protector for battery maintenance and operable to continuously monitor the battery terminal voltage of a storage battery while the latter is not in used which is connected to a battery charger and to control charging of the battery by controlling energization of the battery charger from an AC power source in accordance with said battery terminal voltage, said charge protector comrising:

means energizable from said battery to sense said battery terminal voltage;

means energizable from said battery to effect initial energization of said battery charger from said AC power source when said battery terminal voltage is sensed as being at a predetermined minimum charge voltage level;

means energizable from said battery to repeatedly effect subsequent de-energization and energization of said battery charger from said AC power source when said battery terminal voltage is sensed as having reached an upper trip level voltage and a lower trip level voltage, respectively, said lower trip level voltage being greater than said minimum charge voltage level and said upper trip level voltage being greater than said lower trip level voltage;

and timer means energizable from said battery to maintain energization of said battery charger from said AC power source for a predetermined interval of time after said battery terminal voltage is sensed as having reached said upper trip level voltage but before it reaches a maximum charge level voltage which is greater than said upper trip level voltage.

6. A charge protector according to claim 5 including means energizable from said battery to adjust the upper and lower trip level voltages.

7. A charge protector according to claim 5 or 6 including means energizable from said battery to adjust the length of said predetermined interval of time.

8. A charge protector according to claim 5 or 6 including means energizable from said battery to indicate that said trip level voltages have been reached and that said timer means is in operation.

9. Apparatus comprising:

a storage battery having battery terminals;

a source of AC electrical power;

a battery charger connectable to said source of AC electrical power for supplying DC electrical power to said battery terminals for charging said battery;

and charge protector means operable to continuously monitor said battery while the battery is not in use and comprising:

relay means energizable from said battery operable for connecting and disconnecting said battery charger to and from said source of AC power;

and control means connected to said battery terminals and energizable from said battery for operating said relay means in response to the battery terminal voltage to:

effect initial connection of said battery charger to said source of AC electrical power when said battery terminal voltage is at a predetermined minimum charge voltage level;

maintain said battery charger connected to said AC electrical power source until said battery terminal voltage reaches a predetermined upper trip level voltage;

continue to maintain said battery charger connected to said AC electrical power source for a predetermined interval of time after said upper trip level voltage is reached to enable said battery terminal voltage to exceed said upper trip level voltage but before it reaches a maximum charge level voltage which is greater than said upper trip level voltage;

disconnect said battery charger from said AC electrical power source after said predetermined interval of time has expired;

reconnect said battery charger to said AC electrical power source after said battery terminal voltage has dropped to a predetermined lower trip level voltage, said lower trip level voltage being greater than said minimum charge voltage level and said upper trip level voltage being greater than said lower trip level voltage;

and repeatedly disconnect said battery charger after said battery terminal voltage has again reached and exceeded said upper trip level voltage for an interval of time but before it reaches a maximum charge level voltage which is greater than said upper trip level voltage and reconnect said battery charger after said battery terminal voltage has again dropped to said lower trip level voltage until said battery terminal voltage reaches a charge voltage level which is greater than said upper trip level voltage but less than said maximum charge level voltage.

10. Apparatus for battery maintenance and for continuously monitoring an electric storage battery while said battery is not in use and for charging said electric storage battery comprising:

a battery charger energizable from an AC source for converting AC power from said AC source to DC power for charging said battery;

and a charge protector energizable from said battery and operable to continuously monitor battery terminal voltage and to connect and disconnect said battery charger from the AC source in accordance with said battery terminal voltage to control charging of said battery;

said charge protector comprising:

a relay energizable from said battery of controlling energization of said battery charger from said AC source; and a control circuit energizable from said battery for continuously monitoring battery terminal voltage and for operating said relay accordingly;

said control circuit comprising an enabling circuit to effect initial connection of said battery charger to said AC source only if battery terminal voltage is at a minimum charge voltage level and of correct polarity;

said control circuit also comprising a logic circuit to repeatedly effect disconnection and reconnection of the battery charger when battery terminal voltage reaches an upper trip level voltage and a lower trip level voltage, respectively, said lower trip level voltage being greater than said minimum charge voltage level and said upper trip level voltage being greater than said lower trip level voltage;

and said control circuit further comprising a timer circuit to delay disconnection and maintain said battery charger connected for some selected interval of time after said upper trip level voltage has been reached but before a maximum charge level voltage is reached which is greater than said upper trip level voltage.

11. Apparatus according to claim 10 wherein said charge protector further includes an indicator circuit operable to provide a visual display of battery terminal voltage.

12. Apparatus according to claim 10 or 11 wherein said control circuit includes means to adjust the upper and lower trip level voltages.

13. Apparatus according to claim 11 wherein said control circuit includes means to adjust the length of said predetermined interval of time.

* * * * *